United States Patent
Hisazumi et al.

(10) Patent No.: US 8,798,863 B2
(45) Date of Patent: Aug. 5, 2014

(54) ELECTRICALLY DRIVEN POWER STEERING SYSTEM

(71) Applicant: Hitachi Automotive Systems Steering, Ltd., Saitama (JP)

(72) Inventors: Takumi Hisazumi, Atsugi (JP); Atsushi Yoshitake, Ebina (JP)

(73) Assignee: Hitachi Automotive Systems Steering, Ltd., Saitama (JP)

(*) Notice: Subject to any disclaimer, the term of this patent is extended or adjusted under 35 U.S.C. 154(b) by 0 days.

(21) Appl. No.: 13/962,570

(22) Filed: Aug. 8, 2013

(65) Prior Publication Data

US 2014/0088831 A1    Mar. 27, 2014

(30) Foreign Application Priority Data

Sep. 24, 2012  (JP) .................. 2012-209318

(51) Int. Cl.
*B62D 5/04*           (2006.01)
(52) U.S. Cl.
USPC .......................................... 701/41
(58) Field of Classification Search
None
See application file for complete search history.

(56) References Cited

U.S. PATENT DOCUMENTS

| | | | |
|---|---|---|---|
| 5,303,156 A * | 4/1994 | Matsuoka et al. ............. 701/43 |
| 5,857,325 A * | 1/1999 | Shimasaki et al. ............. 60/284 |
| 5,883,774 A * | 3/1999 | Kida et al. .................. 361/58 |
| 5,920,174 A * | 7/1999 | Kawada et al. ............... 318/663 |
| 5,994,790 A * | 11/1999 | Nagashima et al. ......... 307/10.1 |
| 6,593,714 B2 * | 7/2003 | Nagayama ............... 318/400.07 |
| 6,837,331 B2 * | 1/2005 | Kawada et al. ............... 180/446 |
| 6,907,334 B2 * | 6/2005 | Yoshida et al. .................. 701/41 |
| 7,002,313 B2 * | 2/2006 | Kawada .......................... 318/564 |
| 7,483,796 B2 * | 1/2009 | McLaughlin et al. .......... 702/58 |
| 7,548,443 B2 * | 6/2009 | Arisawa et al. ............... 363/132 |
| 7,791,293 B2 | 9/2010 | Nagase et al. |
| 8,310,187 B2 * | 11/2012 | Yabuguchi et al. ...... 318/400.21 |
| 8,410,734 B2 * | 4/2013 | Ueda et al. ............... 318/400.02 |
| 2003/0020430 A1 * | 1/2003 | Hiraga et al. .................. 318/729 |
| 2006/0208690 A1 * | 9/2006 | Ueda et al. .................... 318/807 |
| 2008/0067960 A1 * | 3/2008 | Maeda et al. ............ 318/400.02 |
| 2008/0191655 A1 * | 8/2008 | Ueda et al. ..................... 318/609 |
| 2008/0243339 A1 * | 10/2008 | Nishimori et al. .............. 701/41 |
| 2008/0315809 A1 * | 12/2008 | Tamaizumi ............. 318/400.23 |
| 2009/0009127 A1 * | 1/2009 | Imamura et al. .............. 318/601 |

(Continued)

FOREIGN PATENT DOCUMENTS

JP         2009-81930 A      4/2009

OTHER PUBLICATIONS

IEEE search histories (3 pages) performed on Mar. 6, 2014.*

*Primary Examiner* — John R Olszewski
*Assistant Examiner* — Navid Ziaeianmehdizadeh
(74) *Attorney, Agent, or Firm* — Crowell & Moring LLP

(57) ABSTRACT

In an electrically driven power steering system having a blushless three phase motor, an abnormality of a control unit is detected on a basis of a direct current bus bar current of an inverter detected by a current sensor and an estimated primary current. The estimated primary current is calculated from, for example, the following equation, namely, Iu×Du+Iv×Dv+Iw×Dw)/100%, wherein Iu denotes a current of a U phase of the motor, Du denotes a PWM duty signal of the U phase, Iv denotes a current of a V phase of the motor, Dv denotes the PWM duty signal of the V phase of the motor, Iw denotes a current of a W phase of the motor, and Dw denotes the PWM duty signal of the W phase.

20 Claims, 5 Drawing Sheets

(56) References Cited

U.S. PATENT DOCUMENTS

| | | |
|---|---|---|
| 2009/0079373 A1* | 3/2009 | Nagase et al. ........... 318/400.22 |
| 2011/0010051 A1* | 1/2011 | Ura ............................... 701/41 |
| 2011/0025244 A1* | 2/2011 | Ura ......................... 318/400.21 |
| 2012/0118662 A1* | 5/2012 | Sakai et al. .................. 180/443 |
| 2012/0274260 A1* | 11/2012 | Takahashi et al. ............ 318/490 |
| 2013/0063062 A1* | 3/2013 | Itamoto et al. ........... 318/400.21 |
| 2013/0207586 A1* | 8/2013 | Hayashi ........................ 318/490 |
| 2013/0241452 A1* | 9/2013 | Suzuki ..................... 318/400.15 |
| 2013/0278198 A1* | 10/2013 | Ito ................................ 318/490 |

* cited by examiner

ELECTRICALLY DRIVEN POWER STEERING SYSTEM

BACKGROUND OF THE INVENTION (1) Field of the Invention

The present invention relates to an abnormality detection of an electrically driven (or an electric) power steering system (or abbreviated as EPS).

(2) Description of Related Art

In an excessive current abnormality monitoring of a motor drive circuit, a current sensor disposed independently of another current sensor used in a motor drive control detects a current caused to flow from a power supply to an inverter circuit. Thus, by setting an abnormality detection threshold value with a current output in a transient response state with respect to a maximum current in a normal use range taken into consideration, the abnormality of the motor drive circuit is monitored.

In addition, in a case where an excessive current abnormality is monitored using a current sensor for the motor drive control in the normal use region in terms of a manufacturing cost reduction demand, the abnormality is detected from an averaged value of the detected current by means of a filter. Hence, a sufficiently high abnormality detection threshold value with respect to the maximum current of the normal use region is set as described in a Japanese Patent Application First Publication (tokkai) 2009-81930 published on Apr. 16, 2009 (which corresponds to a U.S. Pat. No. 7,791,293 issued on Sep. 7, 2010).

SUMMARY OF THE INVENTION

However, in a case where the excessive current abnormality is generated in the motor drive circuit, the abnormality cannot be detected unless the excessive current deviated from the maximum current in the normal use region is caused to flow through the motor drive circuit. That is to say, it becomes impossible to detect the excessive current abnormality for the excessive current lower than the abnormality detection threshold value. That is to say, it becomes impossible to detect the excessive current abnormality in a case of the excessive current which is equal to or larger than the maximum current in the normal use region but is lower than the abnormality detection threshold value.

In addition, in a case where the abnormality detection threshold value is made lower in order to improve an abnormality detection ability, there is a possibility of erroneously detecting the abnormality when the current in the normal transient response is detected. Therefore, it becomes difficult to make the abnormality detection threshold value equal to the maximum current value in the normal use region.

It is, therefore, an object of the present invention to provide an electrically driven power steering system which can improve the abnormality detection ability and can suppress the erroneous detection of the abnormality.

According to one aspect of the present invention, there is provided an electrically driven power steering system, comprising: a steering mechanism that steers steerable wheels along with a steering operation of a steering wheel; a motor providing a steering force for the steering mechanism; a control unit drivingly controlling the motor; a command signal calculating section disposed in the control unit to calculate a vector control command signal for drivingly controlling the motor in accordance with a driving situation of a vehicle; a two-phase to three-phase converting section disposed in the control unit to convert the vector control command signal into a voltage command signal for each phase of the motor; a PWM control section disposed in the control unit to output a PWM duty signal (Du, Dv, Dw) of each phase of the motor in accordance with the voltage command signal of a corresponding one of the phases of the motor; an inverter, disposed in the control unit, constituted by a switching circuit controlled by means of the PWM duty signals (Du, Dv, Dw), and drivingly controlling the motor; a current sensor disposed in a direct current bus bar of the inverter to detect a direct current bus bar current; a phase current detecting section disposed in the control unit to detect or estimate a current value Iu, Iv, Iw of each phase of the motor on the direct current bus bar current and the PWM duty signals (Du, Dv, Dw); an estimated primary current calculating section disposed in the control unit to calculate an estimated primary current as follows: (Iu×Du+Iv×Dv+Iw×Dw)/100% on a basis of the current value (Iu, Iv, Iw) of each phase of the motor and the PWM duty signals (Du, Dv, Dw); and an abnormality monitoring section configured to detect an abnormality of the control unit on a basis of the direct current bus bar and the estimated primary current.

According to another aspect of the present invention, there is provided an electrically driven power steering system, comprising: a steering mechanism that steers steerable wheels along with a steering operation of a steering wheel; a motor providing a steering force for the steering mechanism; a control unit drivingly controlling the motor; a command signal calculating section disposed in the control unit to calculate vector control command signals Vd*, Vq* for drivingly controlling the motor in accordance with a driving situation of a vehicle; a two-phase to three-phase converting section disposed in the control unit to convert each of the vector control command signals into the voltage command signal for each phase of the motor; a PWM control section disposed in the control unit to output a PWM duty signal (Du, Dv, Dw) of each phase of the motor in accordance with the voltage command signal of a corresponding one of the three phases of the motor; an inverter, disposed in the control unit, constituted by a switching circuit controlled by means of the PWM duty signals (Du, Dv, Dw), and drivingly controlling the motor; a current sensor disposed in a direct current bus bar of the inverter to detect a direct current bus bar current; a phase current detecting section disposed in the control unit to detect or estimate a current value of each phase of the motor on a direct current bus bar current and the PWM duty signals (Du, Dv, Dw); a three-phase to two-phase converting section disposed in the control unit to convert the current value of each phase of the motor into two phase current values Id, Iq for a vector control purpose; a voltage detector disposed in the control unit to detect a power supply voltage Vbatt supplied to the control unit; an estimated primary current calculating section disposed in the control unit to calculate an estimated primary current as follows: (Id×Vd*+Iq×Vq*)/Vbatt on a basis of the vector control command signals Vd*, Vq*, two phase current values Id, Iq, and the power supply voltage; and an abnormality monitoring section configured to detect an abnormality of the control unit on a basis of the direct current bus bar current and the estimated primary current.

According to a still another aspect of the present invention, there is provided an electrically driven power steering system, comprising: a steering mechanism that steers steerable wheels along with a steering operation of a steering wheel; a motor providing a steering force for the steering mechanism; a control unit drivingly controlling the motor; a command signal calculating section disposed in the control unit to calculate vector control command signals for drivingly controlling the motor in accordance with a driving situation of a vehicle; a two-phase to three-phase converting section disposed in the control unit to convert each of the vector control command signals into a voltage command signal for each phase of the motor; a PWM control section disposed in the control unit to output a PWM duty signal (Du, Dv, Dw) of each phase of the motor in accordance with the voltage command signal of a corresponding one of the three phases of the motor; an inverter, disposed in the control unit, constituted by a switching circuit controlled by means of the PWM duty signals (Du, Dv, Dw), and drivingly controlling the motor; a current sensor disposed in a direct current bus bar of the inverter to detect a direct current bus bar current; a phase current detecting section disposed in the control unit to detect or estimate a current value of each phase of the motor on a direct current bus bar current and the PWM duty signals (Du, Dv, Dw); a three-phase to two-phase converting section disposed in the control unit to convert the current value of each phase of the motor into two phase current values Id, Iq for a vector control purpose; another three-phase to two-phase converting section disposed in the control unit to convert the PWM duty signals into d-axis and q-axis PWM duty signals Dd, Dq; an estimated primary current calculating section disposed in the control unit to calculate an estimated primary current as follows: (Id×Dd+Iq×Dq)/100% on a basis of the current values for the vector control signal purpose Id, Iq, d-axis, q-axis PWM duty vector control command signals Vd*, Vq*, two phase current values Id, Iq, and the power supply voltage; and an abnormality monitoring section configured to detect an abnormality of the control unit on a basis of the direct current bus bar current and the estimated primary current.

DETAILED DESCRIPTION OF THE INVENTION

Each of first, second, and third preferred embodiments of an electrically driven power steering system according to the present invention will be described below with reference to the attached drawings.

First Embodiment

Figure 1:
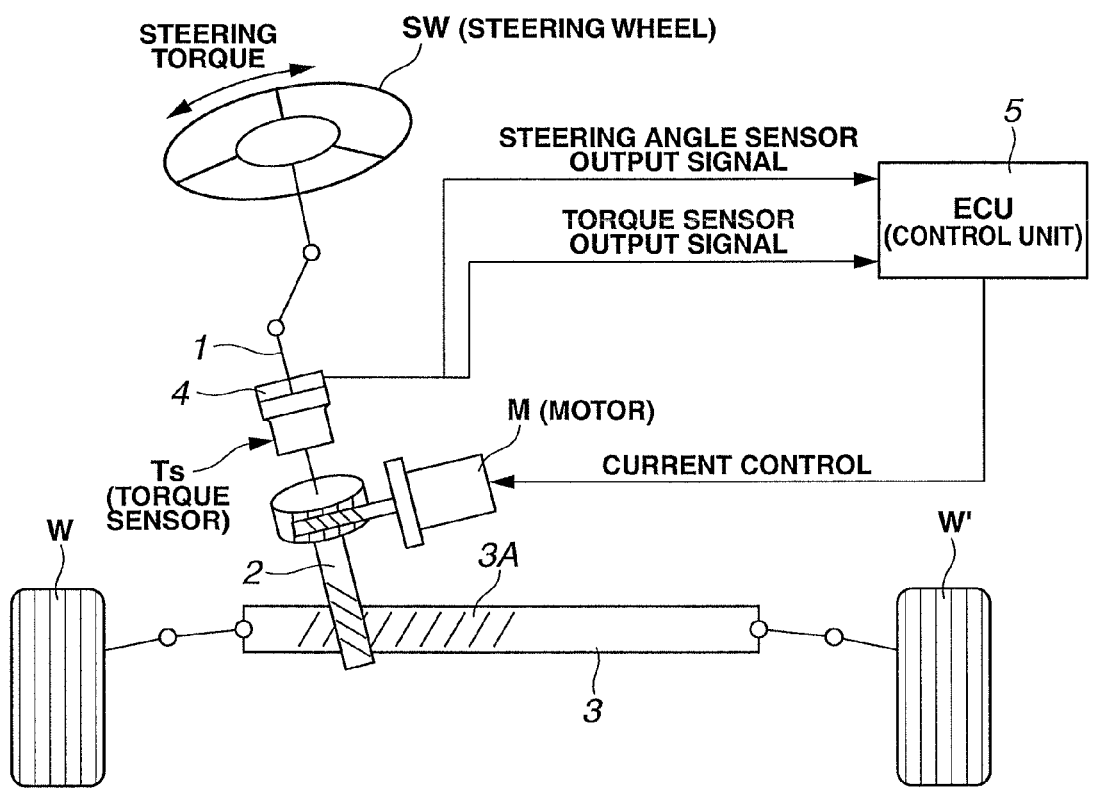
FIG. 1 is a schematic configuration view representing an electrically driven power steering system in a first preferred embodiment according to the present invention.

FIG. 1 shows a rough view representing an electrically driven power steering system in a first preferred embodiment.

The electrically driven power steering system shown in FIG. 1 is constituted by a basic steering mechanism including: a steering wheel SW; a steering shaft 1; a pinion axle 2; and a rack axle 3.

When this steering mechanism is so structured that a steering torque of steering wheel SW is transmitted to pinion axle 2 via steering shaft 1 when a vehicle driver rotates steering wheel SW via steering shaft 1 and a rotational motion of pinion axle 2 is converted into a linear motion of rack axle 3 and left and right steerable wheels W linked to both ends of rack axle 3 are steered. In other words, rack axle 3 is formed with rack teeth 3A meshed with pinion axle 2. By the mesh of rack axle 3A with pinion axle 2, a conversion mechanism which converts the rotation of steering shaft 1 to a steering operation of steerable wheels W, W' is formed.

Torque sensor TS and steering angle sensor 4 are installed on steering shaft 1 to detect a rotational angle of steering shaft 1. A current control of a motor M (for example, a three-phase blushless motor, (hereinafter, referred to as the three-phase blushless motor)) by means of a control unit (hereinafter, referred to as an ECU) based on output signals of torque sensor TS and steering angle sensor 4 so as to provide a steering assistance force for pinion axle 2 from three-phase blushless motor M.

Figure 2:
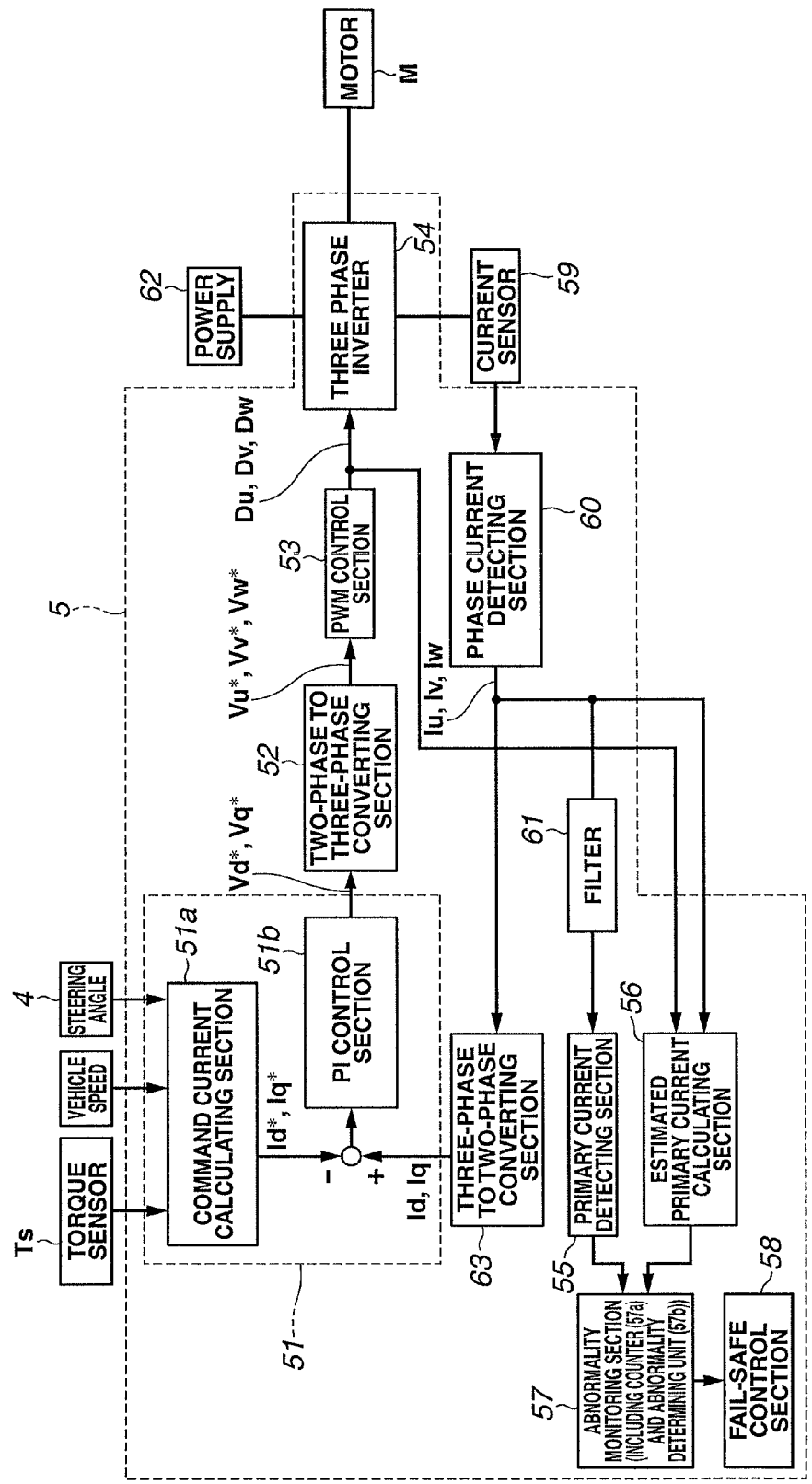
FIG. 2 is a block diagram representing an ECU (Electronic Control Unit) in the first preferred embodiment shown in FIG. 1.

FIG. 2 shows a rough block diagram of above-described ECU 5. As shown in FIG. 2, ECU 5 includes: a command signal calculating section 51; a two-phase to three-phase converting section 52; a PWM (Pulse Width Modulation) control section 53; an inverter 54; a phase current detecting section 60; a three-phase to two-phase converting section 63; a filter 61; a primary current detecting section 55; an estimated primary current calculating section 56; an abnormality monitoring section 57; and a fail-safe control section 58.

Command signal calculating section 51 includes: a command current calculating section 51a; and a PI control section 51b. Command current calculating section 51a calculates command currents Id*, Iq* to drivingly control three-phase blushless motor M in accordance with the driving situation of the vehicle (the output signals of torque sensor TS, vehicle speed sensor, and steering angle sensor 4). PI control section 51b inputs a deviation between command currents Id*, Iq* and two phase current values Id, Iq outputted from three-phase to two-phase converting section 63, performs a proportional-and-integration calculation for the deviation, and calculates vector control command signals Vd*, Vq* to control three-phase brushless motor M.

Two-phase to three-phase converting section 52 converts two-phase vector control command signals Vd*, Vq* into voltage command signals Vu*, Vv*, Vw* of U phase, V phase, and W phase of three phase blushless motor M.

PWM control section 53 outputs PWM duty signals Du, Dv, Dw to respective phases of U, V, and W phases of three-phase blushless motor M in accordance with voltage command signals Vu*, Vv*, and Vw* of the respective phases of motor M.

Inverter 54 is constituted by a switching circuit in which switching elements (for example, FETs (Field Effect Transistors) are bridge connected together. The switching elements are switchingly operated on a basis of PWM duty signals of Du, Dv, and Dw so that a direct current voltage of power supply 62 is converted into a three-phase alternating current voltage Vu, Vv, Vw and is supplied to three-phase blushless motor M. Thus, three-phase blushless motor M is rotationally driven so that the torque generated by three-phase blushless motor M is provided for pinion axle 2 as the steering assistance force.

Current sensor 59 is, for example, constituted by a shunt resistor and is disposed at a direct current side of inverter 54 to detect a direct current bus bar current. It should be noted that the position at which current sensor 59 is disposed may be at an upstream side of inverter 54 or alternatively at a downstream side of inverter 54 if the position is at the direct current side of inverter 54.

Phase current detecting section 60 estimates current values of Iu, Iv, Iw of the respective phases of three-phase blushless motor M on a basis of the direct current bus bar current and PWM duty signals of Du, Dv, and Dw.

It should be noted that a method of estimating Iu, Iv, Iw which are current values of the respective phases of three-phase blushless motor M from the direct current bus bar current will be explained on a basis of FIG. 3.

Figure 3:
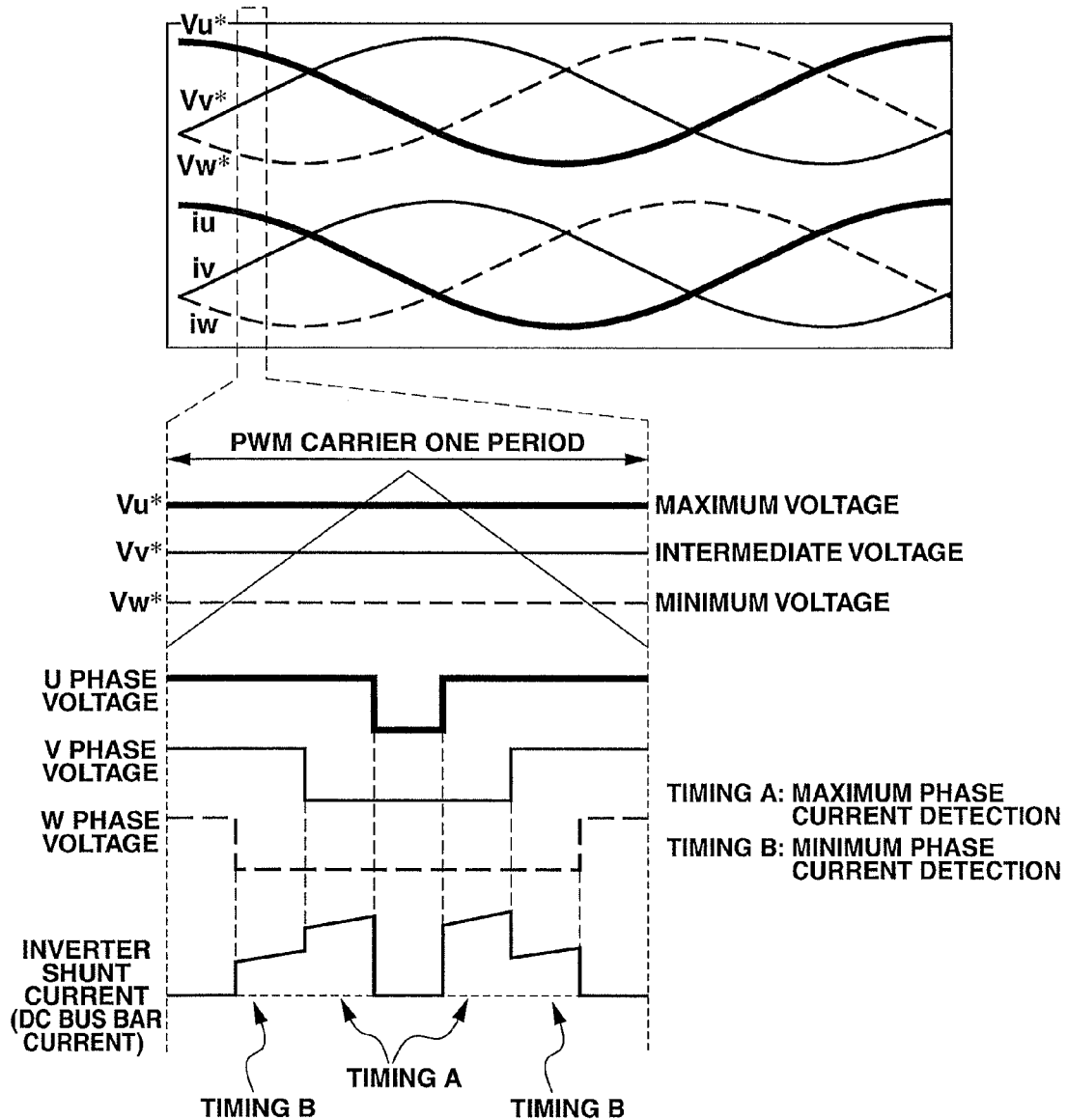
FIG. 3 is a timing chart representing a voltage command value of an inverter shown in FIG. 2 and a direct current bus bar current in the inverter.

FIG. 3 shows voltage command values Vu*, Vv*, Vw* of the respective phases of three-phase blushless motor M, current values of three phases Iu, Iv, Iw of three phases, voltage command values Vu*, Vv*, Vw* of the respective phases of three-phase blushless motor M in one cycle of a PWM carrier, U phase voltage, V phase voltage, W phase voltage, the direct current bus bar current detected by current sensor (shunt resistor) 59.

At a timing of a PWM carrier one frequency period shown in FIG. 3, as a result of comparison between voltage command values of Vu*, Vv*, Vw* and the PWM carrier, the U phase is a maximum phase in which an ON duration of the PWM duty signal is longest, the V phase is an intermediate (middle) phase in which the ON duration of the PWM duty signal is the second longest, and the W phase is a minimum phase in which the ON duration of the PWM duty signal is the shortest from among U phase, V phase, and W phase.

The direct current bus bar current of timing A between an ON duration of the PWM duty signal of the U phase which is the maximum phase from among the U phase, V phase, and W phase (a time interval from a time at which the PWM duty signal of the U phase is turned from OFF to ON) and the ON duration of the PWM duty signal of the V phase which is the intermediate phase after the ON duration of the PWM duty signal of the U phase is detected (the time interval to a time at which the PWM duty signal of the V phase is turned from OFF to ON) so that the current flowing in the U phase which is the maximum phase can be detected. That is to say, the interval of time at timing A is such that only U phase is turned ON and V phase and W phase are in OFF state. Hence, if the direct current bus bar current is detected at timing A, only the U phase current can be detected. It should be noted that, if the direct current bas bar current during an interval at which the PWM duty signal of the V phase which is the intermediate phase is turned to OFF and, thereafter, the PWM duty signal of the U phase which is the maximum phase is turned to OFF is detected, the current of the U phase which is the maximum phase can be detected in the same way as described above.

In addition, if the direct current bas bur current at a timing B at which, after the PWM duty signal of V phase which is the intermediate phase from among U phase, V phase, and W phase is turned to ON, the PWM duty signal of the W phase which is the minimum phase is turned to ON is detected, the current of the W phase only can be detected. It should be noted that, if the direct current bus bar current during the time duration until the PWM duty signal of the V phase which is the intermediate phase is turned to OFF after the PWM duty signal of the W phase which is the minimum phase is detected to be turned to OFF, the current of the W phase which is the minimum phase can also be detected in the same way as described above. It should also be noted that, although the actual current value indicates a minus value since U phase and V phase are turned to ON and W phase is turned to OFF, as viewed from FIG. 3, the current value is apparently converted into a plus value.

Furthermore, the current of the V phase which is the intermediate phase is calculated from the detected current of the U phase which is the maximum phase and from the detected current of the W phase which is the minimum phase. That is to say, utilizing a total of the current values of the three phases is zero, the current value of the remaining phase can be calculated from the current values of the two phases.

Current values Iu, Iv, Iw of three phases estimated at phase current detecting section 60 are converted into current values of two phases Id, Iq by means of three-phase to two-phase converting section 63 and are used for calculations of vector control voltage command signals Vd*, Vq*.

In addition, current values of Iu, Iv, Iw estimated at phase current detecting section 60 are outputted to a filter 61 and an estimated primary current calculating section 56.

Filter 61 averages current values of three phases, namely, Iu, Iv, Iw and a primary current detecting section 55 detects the averaged value through filter 61 as the primary current detection value (direct current bus bar current) and the detected primary current value is outputted to an abnormality monitoring section 57.

Estimated primary current calculating section 56 inputs current values of the three phases Iu, Iv, Iw outputted from phase current detecting section 60 and PWM duty signals Du, Dv, Dw outputted from PWM control section 53 and, thereafter, calculates the estimated primary current in accordance with the following equation (1) and outputs the estimated primary current value to abnormality monitoring section 57.

$$\text{Estimated primary current} = (Iu \times Du + Iv \times Dv + Iw \times Dw)/100\% \quad (1)$$

Abnormality monitoring section 57 monitors the abnormality of the control unit on a basis of the primary current detection value outputted from primary current detecting section 55 and the estimated primary current calculated at estimated primary current calculating section 56.

A method of monitoring the abnormality at abnormality monitoring section 57 includes a method in which an absolute value of a difference between the primary current detection value (direct current bus bar current) and the estimated primary current is compared with a predetermined value for each predetermined period by means of a counter (or counting means not shown), an abnormality determination count value is increased when the difference absolute value is equal to or larger than a predetermined value, and the abnormality determination count value is decreased when the difference absolute value is smaller than the predetermined value. Then, an abnormality determining section (or abnormality determining means or an abnormality determining unit) determines that the occurrence of abnormality when the abnormality determination count value is in excess of a threshold value of the abnormality determination count value.

In addition, a weighting of the abnormality determining count value which is increased or decreased may be changed depending upon whether the difference absolute value is equal to or larger than the predetermined value or smaller than the predetermined value. For example, a percentage of the abnormality determining count value which is increased when the difference absolute value is equal to or larger than the predetermined value and that which is decreased when the difference absolute value is smaller than the predetermined value may be set to 6:4.

Finally, in a case where abnormality monitoring section 57 is determined to be abnormal, the abnormality information is inputted to fail-safe control section 58 so that the electrically driven power steering system is safely stopped.

As described above, since, according to an electrically driven power steering system in the first embodiment, the estimated primary current based on PWM duty signals Du, Dv, Dw calculated in accordance with vector control command signals Vd*, Vq* is used to be compared with the primary current value, it becomes possible to perform the abnormality monitoring in accordance with vector control command signals Vd*, Vq*. Consequently, as compared with the case where the abnormality detection threshold value for the excessive current detection purpose is constant regardless of a magnitude of the motor current command value (vector control command signal, the excessive current state can be detected even when the motor current command value (the vector control command signal) is relatively small. Thus, the improvement in the abnormality detection ability can be made.

In addition, in order to improve the abnormality detection ability, as compared with the case where the abnormality detection threshold value is simply equal to the maximum current of the normal use region, the erroneous detection can be suppressed.

Furthermore, since the abnormality monitoring is performed using the abnormality determining count value, the occurrence of the abnormality is not detected in a case where the detection of the abnormality value is a temporal even in a case where the abnormality value is detected due to a noise or so forth generated in the control unit. Hence, it is possible to suppress the erroneous detection.

In addition, the weighting of the abnormality determining count value at a time of the increase or at a time of the decrease is changed. Hence, it becomes possible to detect the abnormality even in the case where the difference absolute value is detected to approximately the same degree such that the difference absolute value is equal to or larger than the predetermined value or and the difference absolute is smaller than the predetermined value Furthermore, since phase current detecting section 60 estimates a current of each phase of U phase, V phase, and W phase so that only current sensor for each phase is not needed and only current sensor 59 installed on the direct current bus bar can detect all of currents in the three phase.

In addition, the shunt resistor is installed at the upstream side only to detect the excessive current in addition to the current sensor (shunt resistor) at the downstream side used for the actual motor control. However, in the first embodiment, the primary current detection value is detected by means of estimated primary current detecting section 55 so that only the current sensor (shunt resistor) 59 can detect the excessive current. That is to say, in a case where a penetrating current is caused to flow from the upstream side to the downstream side of inverter 54, a large current is caused to flow through the maximum phase so that the primary current detection value indicates a large value. Thus, the excessive current can be detected. Consequently, the shunt resistor at the upstream side for an exclusive use of the excessive current detection is eliminated and the excessive current can be detected only by means of the current sensor (shut resistor 59) actually used in the motor control.

Second Embodiment

Next, the electrically driven power steering system in a second preferred embodiment according to the present invention will be explained on a basis of FIG. 4.

Figure 4:
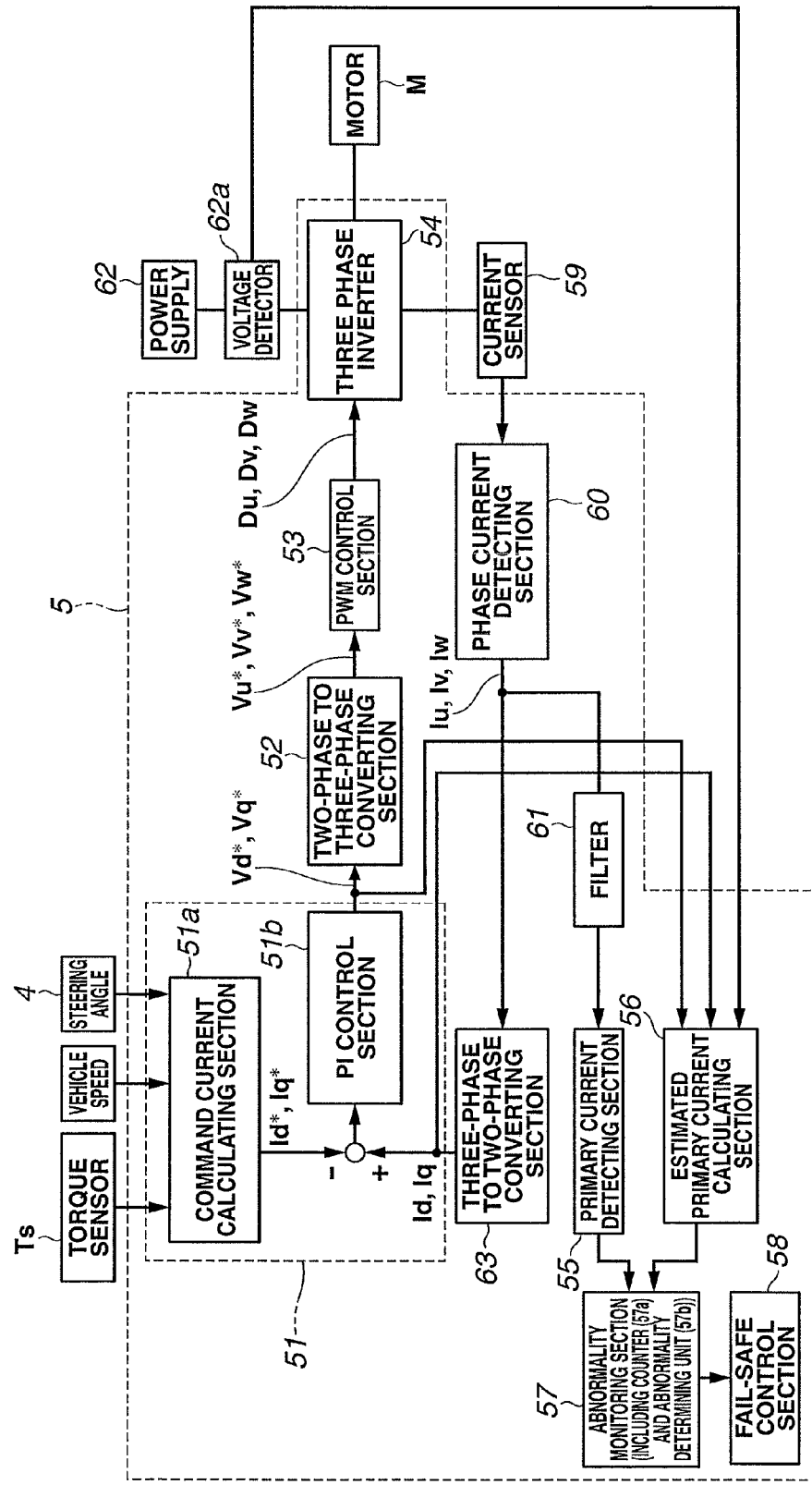
FIG. 4 is a block diagram representing the ECU in a second preferred embodiment according to the present invention.

The difference points of the second embodiment shown in FIG. 4 from the first embodiment shown in FIG. 2 are such that a voltage detector is installed to detect the voltage across power supply 62 and the method of calculation of the estimated primary current in estimated primary current calculating section 56. The other structures are the same as those in the case of the first embodiment and the explanation thereof will be omitted with the same symbols designated.

Estimated primary current calculating section 56 in the second embodiment inputs two phase currents Id, Iq outputted from three phase to two phase converting section 63, vector control command signals Vd*, Vq* outputted from PI control section 51b, and a power supply voltage Vbatt outputted from PI control section 51b.

Then, the estimated primary current is calculated in the following equation (2) and outputs the estimated (calculated) primary current to abnormality monitoring section 57.

$$\text{Estimated primary current} = (Id \times Vd^* + Iq \times Vq^*)/Vbatt \qquad (2)$$

Abnormality monitoring section 57 performs the abnormality monitoring using this estimated primary current in the same way as the first embodiment.

It should be noted that power supply voltage Vbatt may be not the battery voltage of the vehicle but may be the battery voltage of control unit (ECU) 5. Thus, since the power supply of ECU 5 is nearer to the control unit than the power supply of the vehicle, the voltage information can easily be obtained.

As described above, according to the electrically driven power steering system in the second embodiment, the estimated primary current based on vector control command signals Xd*, Vq* is used to be compared with the primary current value. Thus, the same advantages as the first embodiment can be obtained.

Third Embodiment

Figure 5:
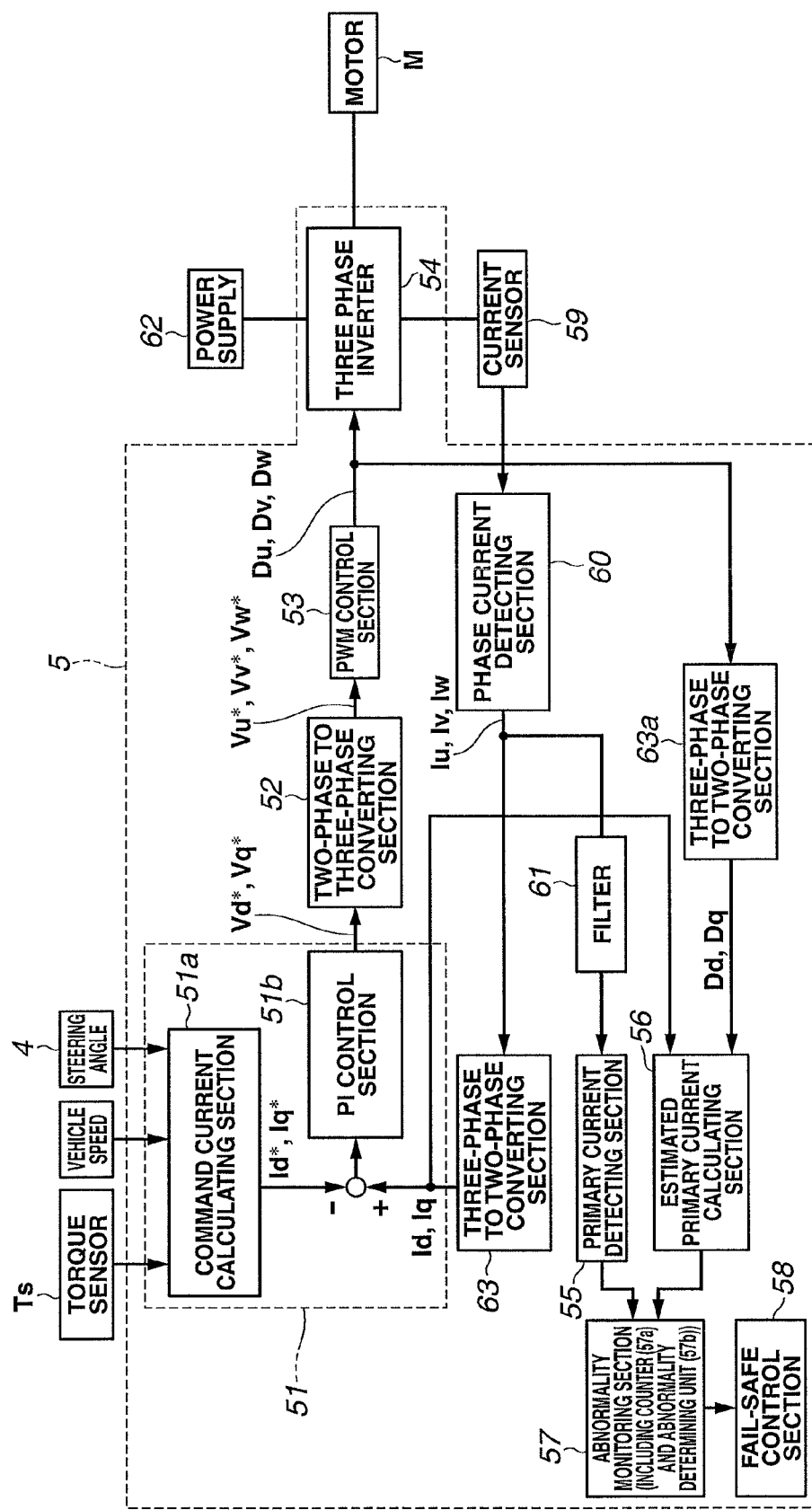
FIG. 5 is a block diagram representing the ECU in a third preferred embodiment according to the present invention.

FIG. 5 shows a third preferred embodiment of the electrically driven power steering system according to the present invention.

In the third embodiment, a three-phase to two-phase converting section 62 installed to convert three phase PWM duty signals Du, Dv, Dw into d-axis and q-axis PWM duty signals and a method of calculating the estimated primary current calculating section 56 are different from the first embodiment. The other structures of the third embodiment are the same as those in the case of the first embodiment and these explanations are omitted herein.

Estimated primary current calculating section 56 in the third embodiment inputs two phase, current values Id, Iq outputted from three-phase to two-phase converting section 51b and two phase PWM duty signals Dd, Dq converted from three phase PWM duty signals Du, Dv, Dw outputted from PWM control section 53 by means of three-phase to two-phase converting section 62.

Estimated primary current calculating section 56 calculates the estimated primary current using the following equation (3) and outputs the estimated primary current to abnormality monitoring section 57.

$$\text{Estimated primary current} = (Id \times Dd + Id \times Dq)/100\% \qquad (3)$$

Abnormality monitoring section 57 performs the abnormality monitoring in the same way as the first embodiment using the estimated primary current.

As described above, according to the electrically driven power steering system in the third embodiment, the estimated primary current based on d-axis and q-axis PMW duty signals calculated in accordance with vector control command signals Vd*, Vq* is used to be compared with the primary current value. Hence, the same action and advantage as those of the first or second embodiment can be achieved.

As described hereinabove, the detailed description has been made with respect to only the described specific examples. However, various changes and modifications may be made in a range of a technical concept of the present invention without departing from the scope of the present invention.

For example, in each of the first, second, and third embodiments, three phase current values Iu, Iv, Iw is are estimated from the direct current bus bar current. However, the current sensors are disposed in all of three phases and current values Iu, Iv, Iw may be detected, respectively.

In addition, in the first embodiment, the method of monitoring the abnormality using the abnormality determining count value has been explained. Simply, when the primary current value is compared with the estimated primary current and the difference absolute value is in excess of a set value, the occurrence of the abnormality may be determined.

Technical ideas graspable from the respective embodiments described above will be described below together with the effects.

(1) The electrically driven power steering system as claimed in claim 2, wherein the abnormality determining count value which is increased when the absolute value of the difference is equal to or larger than the predetermined value is larger than the abnormality determining count value which is decreased when the absolute value of the difference is smaller than the predetermined value.

According to the technical idea described in item (1), it is possible to detect the abnormality even in a case where the abnormality determining count value is substantially equal to both cases to the absolute value of the difference is equal to or larger than the predetermined value or in a case where the absolute value of the difference is smaller than the predetermined value by changing the weighting on the abnormality determining count value.

(2) The electrically driven power steering system as claimed in claim 1, wherein the phase current detecting section detects the current of a maximum phase in which an ON duration of the PWM duty signal is a longest from among the respective phases of U phase, V phase, and W phase of the motor on a basis of the direct current bas bur current during a time interval at which the PWM duty signal of an intermediate phase in which the ON duration of the PMW duty signal is a second longest is turned to ON after the PWM duty signal of the maximum phase is turned to ON or during a time interval at which the PWM duty signal of the maximum phase is turned to OFF after the PWM duty signal of the intermediate phase is turned to OFF.

According to the technical idea described in item (2), only the current sensor used for the motor control and installed on the direct current bus bar can detect the current of the maximum phase without installation of the current sensors for respective phases of the U phase, V phase, and W phase.

(3) The electrically driven power steering system as set forth in item (2), wherein the phase current detecting section detects the current of a minimum phase from among the respective phases of U phase, V phase, and W phase in which the ON duration of the PWM duty signal is a shortest on the basis of the direct current bas bur current during a time interval at which the PWM duty signal of the minimum phase is turned to ON after the PWM duty signal of the intermediate phase is turned to ON or during a time interval at which the PWM duty signal of the intermediate phase is turned to OFF after the PWM duty signal of the intermediate phase is turned to OFF.

According to the technical idea described in item (3), the current of the minimum phase can be detected by means of only the current sensor used for the motor control without installation of the current sensors in the respective phases of U phase, V phase, and W phase.

(4) The electrically driven power steering system as set forth in item (3), wherein the phase current detecting section estimates the current of the intermediate phase on a basis of the current of the maximum phase and the current of the minimum phase.

According to the technical idea described in item (4), utilizing a fact that a total of currents of U phase, V phase, and W phase is zero, the information of the intermediate phase can be obtained.

(5) The electrically driven power steering system as claimed in claim 3, wherein the abnormality monitoring section comprises: a counter configured to compare an absolute value of a difference between a direct current bus bar and the estimated primary current with a predetermined value for each predetermined period, to increase an abnormality determining count value when the absolute value of the difference is equal to or larger than the predetermined value, and to decrease the abnormality determining count value when the absolute value of the difference is smaller than the predetermined value; and an abnormality determining unit configured to determine an abnormality of the control unit on a basis of the abnormality determining count value counted by the counter.

According to the technical idea described in item (5), an erroneous determination of the abnormality in a case where a temporary abnormal value due to the noise generated within the control unit is detected can be suppressed.

(6) The electrically driven power steering system as set forth in item (5), wherein the abnormality determining count value which is increased when the absolute value of the difference is equal to or larger than the predetermined value is larger than the abnormality determining count value which is decreased when the absolute value of the difference is smaller than the predetermined value.

According to the technical idea described in item (6), it is possible to detect the abnormality even in a case where the abnormality determining count value is substantially equal to both cases to the absolute value of the difference is equal to or larger than the predetermined value or in a case where the absolute value of the difference is smaller than the predetermined value by changing the weighting on the abnormality determining count value.

(7) The electrically driven power steering system as claimed in claim 3, wherein the power supply voltage Vbatt is a power supply voltage of the control unit.

According to the technical idea described in item (7), the information of power supply voltage Vbatt can easily be obtained without detecting the battery voltage of the vehicle.

(8) The electrically driven power steering system as claimed in claim 3, wherein the phase current detecting section detects the current of a maximum phase in which an ON duration of the PWM duty signal is a longest from among the respective phases of U phase, V phase, and W phase of the motor on a basis of the direct current bas bur current during a time interval at which the PWM duty signal of an intermediate phase in which the ON duration of the PMW duty signal is a second longest is turned to ON after the PWM duty signal of the maximum phase is turned to ON or during a time interval at which the PWM duty signal of the maximum phase is turned to OFF after the PWM duty signal of the intermediate phase is turned to OFF.

According to the technical idea described in item (8), only the current sensor used for the motor control and installed on the direct current bus bar can detect the current of the maximum phase without installation of the current sensors for respective phases of the U phase, V phase, and W phase.

(9) The electrically driven power steering system as claimed in claim 12, wherein the phase current detecting section detects the current of a minimum phase from among the respective phases of U phase, V phase, and W phase in which the ON duration of the PWM duty signal is a shortest on the basis of the direct current bas bur current during a time interval at which the PWM duty signal of the minimum phase is turned to ON after the PWM duty signal of the intermediate phase is turned to ON or during a time interval at which the PWM duty signal of the intermediate phase is turned to OFF after the PWM duty signal of the intermediate phase is turned to OFF.

According to the technical idea described in item (9), the current of the minimum phase can be detected by means of only the current sensor used for the motor control without installation of the current sensors in the respective phases of U phase, V phase, and W phase.

(10) The electrically driven power steering system as set forth in item (9), wherein the phase current detecting section estimates the current of the intermediate phase on a basis of the current of the maximum phase and the current of the minimum phase.

According to the technical idea described in item (10), utilizing a fact that a total of currents of U phase, V phase, and W phase is zero, the information of the intermediate phase can be obtained.

(11) The electrically driven power steering system as claimed in claim 4, wherein the abnormality monitoring section comprises: a counter configured to compare an absolute value of a difference between a direct current bus bar and the estimated primary current with a predetermined value for each predetermined period, to increase an abnormality determining count value when the absolute value of the difference is equal to or larger than the predetermined value, and to decrease the abnormality determining count value when the absolute value of the difference is smaller than the predetermined value; and an abnormality determining unit configured to determine an abnormality of the control unit on a basis of the abnormality determining count value counted by the counter.

According to the technical idea described in item (11), an erroneous determination of the abnormality in a case where a temporary abnormal value due to the noise generated within the control unit is detected can be suppressed.

(12) The electrically driven power steering system as set forth in item (11), wherein the abnormality determining count value which is increased when the absolute value of the difference is equal to or larger than the predetermined value is larger than the abnormality determining count value which is decreased when the absolute value of the difference is smaller than the predetermined value.

According to the technical idea described in item (12), it is possible to detect the abnormality even in a case where the abnormality determining count value is substantially equal to both cases to the absolute value of the difference is equal to or larger than the predetermined value or in a case where the absolute value of the difference is smaller than the predetermined value by changing the weighting on the abnormality determining count value.

(13) The electrically driven power steering system as claimed in claim 4, wherein the phase current detecting section detects the current of a maximum phase in which an ON duration of the PWM duty signal is a longest from among the respective phases of U phase, V phase, and W phase of the motor on a basis of the direct current bas bur current during a time interval at which the PWM duty signal of an intermediate phase in which the ON duration of the PMW duty signal is a second longest is turned to ON after the PWM duty signal of the maximum phase is turned to ON or during a time interval at which the PWM duty signal of the maximum phase is turned to OFF after the PWM duty signal of the intermediate phase is turned to OFF.

According to the technical idea described in item (13), only the current sensor used for the motor control and installed on the direct current bus bar can detect the current of the maximum phase without installation of the current sensors for respective phases of the U phase, V phase, and W phase.

(14) The electrically driven power steering system as set forth in item (13), wherein the phase current detecting section detects the current of a minimum phase from among the respective phases of U phase, V phase, and W phase in which the ON duration of the PWM duty signal is a shortest on the basis of the direct current bas bur current during a time interval at which the PWM duty signal of the minimum phase is turned to ON after the PWM duty signal of the intermediate phase is turned to ON or during a time interval at which the PWM duty signal of the intermediate phase is turned to OFF after the PWM duty signal of the intermediate phase is turned to OFF.

According to the technical idea described in item (14), the current of the minimum phase can be detected by means of only the current sensor used for the motor control without installation of the current sensors in the respective phases of U phase, V phase, and W phase.

(15) The electrically driven power steering system as set forth in item (14), wherein the phase current detecting section estimates the current of the intermediate phase on a basis of the current of the maximum phase and the current of the minimum phase.

According to the technical idea described in item (15), utilizing a fact that a total of currents of U phase, V phase, and W phase is zero, the information of the intermediate phase can be obtained.

(16) The electrically driven power steering system as claimed in claim 1, wherein the current sensor is a shunt resistor and a position of the shunt resistor is at an upstream side or at a downstream side with respect to the inverter.

This application is based on a prior Japanese Patent Application No. 2012-209318 filed in Japan on Sep. 24, 2012. The entire contents of this Japanese Patent Application No. 2012-209318 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. An electrically driven power steering system, comprising:
    a steering mechanism that steers steerable wheels along with a steering operation of a steering wheel;
    a motor providing a steering force for the steering mechanism;
    a control unit drivingly controlling the motor;
    a command signal calculating section disposed in the control unit to calculate a vector control command signal for drivingly controlling the motor in accordance with a driving situation of a vehicle;
    a two-phase to three-phase converting section disposed in the control unit to convert the vector control command signal into a voltage command signal for each phase of the motor;
    a PWM control section disposed in the control unit to output a PWM duty signal (Du, Dv, Dw) of each phase of the motor in accordance with the voltage command signal of a corresponding one of the phases of the motor;

an inverter, disposed in the control unit, constituted by a switching circuit controlled by means of the PWM duty signals (Du, Dv, Dw), and drivingly controlling the motor;

a current sensor disposed in a direct current bus bar of the inverter to detect a direct current bus bar current;

a phase current detecting section disposed in the control unit to detect or estimate a current value Iu, Iv, Iw of each phase of the motor on the direct current bus bar current and the PWM duty signals (Du, Dv, Dw);

an estimated primary current calculating section disposed in the control unit to calculate an estimated primary current as follows: (Iu×Du+Iv×Dv+Iw×Dw)/100% on a basis of the current value (Iu, Iv, Iw) of each phase of the motor and the PWM duty signals (Du, Dv, Dw); and an abnormality monitoring section configured to detect an abnormality of the control unit on a basis of the direct current bus bar and the estimated primary current.

2. The electrically driven power steering system as claimed in claim 1, wherein the abnormality monitoring section comprises: a counter configured to compare an absolute value of a difference between the direct current bus bar current and the estimated primary current with a predetermined value for each predetermined period, to increase an abnormality determining count value when the absolute value of the difference is equal to or larger than the predetermined value, and to decrease the abnormality determining count value when the absolute value of the difference is smaller than the predetermined value; and an abnormality determining unit configured to determine an abnormality of the control unit on a basis of the abnormality determining count value counted by the counter.

3. The electrically driven power steering system as claimed in claim 2, wherein the abnormality determining count value which is increased when the absolute value of the difference is equal to or larger than the predetermined value is larger than the abnormality determining count value which is decreased when the absolute value of the difference is smaller than the predetermined value.

4. The electrically driven power steering system as claimed in claim 1, wherein the phase current detecting section detects the current of a maximum phase in which an ON duration of the PWM duty signal is a longest from among the respective phases of U phase, V phase, and W phase of the motor on a basis of the direct current bas bur current during a time duration at which the PWM duty signal of an intermediate phase in which the ON duration of the PMW duty signal is a second longest is turned to ON after the PWM duty signal of the maximum phase is turned to ON or during a time duration at which the PWM duty signal of the maximum phase is turned to OFF after the PWM duty signal of the intermediate phase is turned to OFF.

5. The electrically driven power steering system as claimed in claim 4, wherein the phase current detecting section detects the current of a minimum phase from among the respective phases of U phase, V phase, and W phase in which the ON duration of the PWM duty signal is a shortest on the basis of the direct current bas bur current during a time duration the PWM duty signal of the minimum phase is turned to ON after the PWM duty signal of the intermediate phase is turned to ON or during a time duration at which the PWM duty signal of the intermediate phase is turned to OFF after the PWM duty signal of the intermediate phase is turned to OFF.

6. The electrically driven power steering system as claimed in claim 5, wherein the phase current detecting section estimates the current of the intermediate phase on a basis of the current of the maximum phase and the current of the minimum phase.

7. The electrically driven power steering system as claimed in claim 1, wherein the current sensor is a shunt resistor and a position of the shunt resistor is at an upstream side or at a downstream side with respect to the inverter.

8. An electrically driven power steering system, comprising:

a steering mechanism that steers steerable wheels along with a steering operation of a steering wheel;

a motor providing a steering force for the steering mechanism;

a control unit drivingly controlling the motor;

a command signal calculating section disposed in the control unit to calculate vector control command signals Vd*, Vq* for drivingly controlling the motor in accordance with a driving situation of a vehicle;

a two-phase to three-phase converting section disposed in the control unit to convert each of the vector control command signals into the voltage command signal for each phase of the motor;

a PWM control section disposed in the control unit to output a PWM duty signal (Du, Dv, Dw) of each phase of the motor in accordance with the voltage command signal of a corresponding one of the three phases of the motor;

an inverter, disposed in the control unit, constituted by a switching circuit controlled by means of the PWM duty signals (Du, Dv, Dw), and drivingly controlling the motor;

a current sensor disposed in a direct current bus bar of the inverter to detect a direct current bus bar current;

a phase current detecting section disposed in the control unit to detect or estimate a current value of each phase of the motor on a direct current bus bar current and the PWM duty signals (Du, Dv, Dw);

a three-phase to two-phase converting section disposed in the control unit to convert the current value of each phase of the motor into two phase current values Id, Iq for a vector control purpose;

a voltage detector disposed in the control unit to detect a power supply voltage Vbatt supplied to the control unit;

an estimated primary current calculating section disposed in the control unit to calculate an estimated primary current as follows: (Id×Vd*+Iq×Vq*)/Vbatt on a basis of the vector control command signals Vd*, Vq*, two phase current values Id, Iq, and the power supply voltage; and an abnormality monitoring section configured to detect an abnormality of the control unit on a basis of the direct current bus bar current and the estimated primary current.

9. The electrically driven power steering system as claimed in claim 8, wherein the abnormality monitoring section comprises: a counter configured to compare an absolute value of a difference between the direct current bus bar and the estimated primary current with a predetermined value for each predetermined period, to increase an abnormality determining count value when the absolute value of the difference is equal to or larger than the predetermined value, and to decrease the abnormality determining count value when the absolute value of the difference is smaller than the predetermined value; and an abnormality determining unit configured to determine an abnormality of the control unit on a basis of the abnormality determining count value counted by the counter.

10. The electrically driven power steering system as claimed in claim 9, wherein the abnormality determining count value which is increased when the absolute value of the difference is equal to or larger than the predetermined value is larger than the abnormality determining count value which is decreased when the absolute value of the difference is smaller than the predetermined value.

11. The electrically driven power steering system as claimed in claim 8, wherein the power supply voltage Vbatt is a power supply voltage of the control unit.

12. The electrically driven power steering system as claimed in claim 8, wherein the phase current detecting section detects the current of a maximum phase in which an ON duration of the PWM duty signal is a longest from among the respective phases of U phase, V phase, and W phase of the motor on a basis of the direct current bas bur current during a time direction at which the PWM duty signal of an intermediate phase in which the ON duration of the PMW duty signal is a second longest is turned to ON after the PWM duty signal of the maximum phase is turned to ON or during a time duration at which the PWM duty signal of the maximum phase is turned to OFF after the PWM duty signal of the intermediate phase is turned to OFF.

13. The electrically driven power steering system as claimed in claim 12, wherein the phase current detecting section detects the current of a minimum phase from among the respective phases of U phase, V phase, and W phase in which the ON duration of the PWM duty signal is a shortest on the basis of the direct current bas bur current during a time duration at which the PWM duty signal of the minimum phase is turned to ON after the PWM duty signal of the intermediate phase is turned to ON or during a time duration at which the PWM duty signal of the intermediate phase is turned to OFF after the PWM duty signal of the intermediate phase is turned to OFF.

14. The electrically driven power steering system as claimed in claim 12, wherein the phase current detecting section estimates the current of the intermediate phase on a basis of the current of the maximum phase and the current of the minimum phase.

15. An electrically driven power steering system, comprising:
a steering mechanism that steers steerable wheels along with a steering operation of a steering wheel;
a motor providing a steering force for the steering mechanism;
a control unit drivingly controlling the motor;
a command signal calculating section disposed in the control unit to calculate vector control command signals for drivingly controlling the motor in accordance with a driving situation of a vehicle;
a two-phase to three-phase converting section disposed in the control unit to convert each of the vector control command signals into a voltage command signal for each phase of the motor;
a PWM control section disposed in the control unit to output a PWM duty signal (Du, Dv, Dw) of each phase of the motor in accordance with the voltage command signal of a corresponding one of the three phases of the motor;
an inverter, disposed in the control unit, constituted by a switching circuit controlled by means of the PWM duty signals (Du, Dv, Dw), and drivingly controlling the motor;
a current sensor disposed in a direct current bus bar of the inverter to detect a direct current bus bar current;
a phase current detecting section disposed in the control unit to detect or estimate a current value of each phase of the motor on a direct current bus bar current and the PWM duty signals (Du, Dv, Dw);
a three-phase to two-phase converting section disposed in the control unit to convert the current value of each phase of the motor into two phase current values Id, Iq for a vector control purpose;
another three-phase to two-phase converting section disposed in the control unit to convert the PWM duty signals into d-axis and q-axis PWM duty signals Dd, Dq;
an estimated primary current calculating section disposed in the control unit to calculate an estimated primary current as follows: $(Id \times Dd + Iq \times Dq)/100\%$ on a basis of the current values for the vector control signal purpose Id, Iq, d-axis, q-axis PWM duty vector control command signals Vd*, Vq*, two phase current values Id, Iq, and the power supply voltage; and
an abnormality monitoring section configured to detect an abnormality of the control unit on a basis of the direct current bus bar current and the estimated primary current.

16. The electrically driven power steering system as claimed in claim 15, wherein the abnormality monitoring section comprises: a counter configured to compare an absolute value of a difference between the direct current bus bar and the estimated primary current with a predetermined value for each predetermined period, to increase an abnormality determining count value when the absolute value of the difference is equal to or larger than the predetermined value, and to decrease the abnormality determining count value when the absolute value of the difference is smaller than the predetermined value; and an abnormality determining unit configured to determine an abnormality of the control unit on a basis of the abnormality determining count value counted by the counter.

17. The electrically driven power steering system as claimed in claim 16, wherein the abnormality determining count value which is increased when the absolute value of the difference is equal to or larger than the predetermined value is larger than the abnormality determining count value which is decreased when the absolute value of the difference is smaller than the predetermined value.

18. The electrically driven power steering system as claimed in claim 15, wherein the phase current detecting section detects the current of a maximum phase in which an ON duration of the PWM duty signal is a longest from among the respective phases of U phase, V phase, and W phase of the motor on a basis of the direct current bas bur current during a time duration at which the PWM duty signal of an intermediate phase in which the ON duration of the PMW duty signal is a second longest is turned to ON after the PWM duty signal of the maximum phase is turned to ON or during a time duration at which the PWM duty signal of the maximum phase is turned to OFF after the PWM duty signal of the intermediate phase is turned to OFF.

19. The electrically driven power steering system as claimed in claim 18, wherein the phase current detecting section detects the current of a minimum phase from among the respective phases of U phase, V phase, and W phase in which the ON duration of the PWM duty signal is a shortest on the basis of the direct current bas bur current during a time interval at which the PWM duty signal of the minimum phase is turned to ON after the PWM duty signal of the intermediate phase is turned to ON or during a time interval at which the PWM duty signal of the intermediate phase is turned to OFF after the PWM duty signal of the intermediate phase is turned to OFF.

20. The electrically driven power steering system as claimed in claim 19, wherein the phase current detecting section estimates the current of the intermediate phase on a basis of the current of the maximum phase and the current of the minimum phase.

* * * * *